(12) United States Patent
Schalli

(10) Patent No.: US 8,551,636 B2
(45) Date of Patent: Oct. 8, 2013

(54) DESCRIBING A TEMPERATURE-CONTROL REQUEST IN ONE BYTE

(75) Inventor: Niklas Schalli, München (DE)

(73) Assignee: Audi AG, Ingolsadt (DE)

( * ) Notice: Subject to any disclaimer, the term of this patent is extended or adjusted under 35 U.S.C. 154(b) by 0 days.

(21) Appl. No.: 13/698,502

(22) PCT Filed: May 12, 2011

(86) PCT No.: PCT/EP2011/002356
§ 371 (c)(1),
(2), (4) Date: Nov. 16, 2012

(87) PCT Pub. No.: WO2011/144310
PCT Pub. Date: Nov. 24, 2011

(65) Prior Publication Data
US 2013/0065095 A1    Mar. 14, 2013

(30) Foreign Application Priority Data
May 19, 2010   (DE) .................... 10 2010 021 038

(51) Int. Cl.
*H01M 10/50*    (2006.01)

(52) U.S. Cl.
USPC ............................................ 429/120; 429/50

(58) Field of Classification Search
USPC ............................................ 429/50, 62, 120
See application file for complete search history.

(56) References Cited

U.S. PATENT DOCUMENTS

| 4,558,410 A | 12/1985 | Holzner et al. |
| 5,726,541 A * | 3/1998 | Glenn et al. .................... 318/16 |
| 2009/0243538 A1* | 10/2009 | Kelty et al. .................... 320/104 |

FOREIGN PATENT DOCUMENTS

| DE | 690 12 072 T2 | 12/1994 |
| EP | 0 057 755 A2 | 8/1982 |
| EP | 1 521 496 A1 | 4/2005 |
| WO | WO2009/012038 A1 | 1/2009 |
| WO | WO2009/120369 A2 | 10/2009 |
| WO | WO93/22151 A1 | 2/2011 |

* cited by examiner

*Primary Examiner* — Nicholas P D'Aniello
(74) *Attorney, Agent, or Firm* — Henry M. Feiereisen LLC

(57) ABSTRACT

A plurality of types of heat-treatment requests are described in a signal in a single byte.

7 Claims, 1 Drawing Sheet

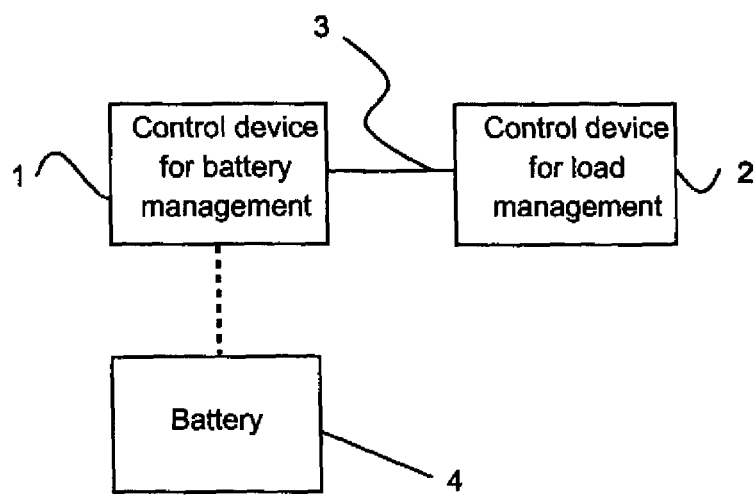

DESCRIBING A TEMPERATURE-CONTROL REQUEST IN ONE BYTE

CROSS-REFERENCES TO RELATED APPLICATIONS

This application is the U.S. National Stage of International Application No. PCT/EP2011/002356, filed May 12, 2011, which designated the United States and has been published as International Publication No. WO 2009/016145 and which claims the priority of German Patent Application, Serial No. 10 2010 021 038.2, filed May 19, 2010, pursuant to 35 U.S.C. 119(a)-(d).

BACKGROUND OF THE INVENTION

The invention relates to a device, a motor vehicle and/or a method with a signal for describing a temperature-control request.

Plug-in hybrid and electric vehicles which can be externally charged are known in the art. It is also known to control the temperature of a battery during the charging process. A plurality of boundary conditions must be observed with respect to various temperature limits.

Conventional rules for temperature-control request are frequently inflexible or overly complicated.

SUMMARY OF THE INVENTION

It is the object of the present invention therefore to provide a proposal for designing temperature-control requests in a particularly space-saving manner, while still being able to satisfy all requests.

This object is attained with the inventions described in the independent claims. Advantageous refinements are recited in the dependent claims.

According to the invention, this object is attained with a method for transmitting a signal describing a temperature-control request for a battery, wherein the signal is in the form of a single byte configured to describe a plurality of types of the temperature-control request. The single byte includes at least the following temperature-control requests: slight heating, intermediate heating and strong heating; slight cooling, intermediate cooling and strong cooling; presence of a fault; and flushing the battery with a fluid for homogenizing a temperature distribution of the battery. The object is also attained with a control device of a motor vehicle for generating and/or evaluating a signal which describes with single byte the aforementioned types of a temperature-control request for a battery of the motor vehicle.

The invention is based on the finding that information can be transmitted in modern binary systems at the most space-saving manner in powers of two. It has been surprisingly found that eight types of the temperature-control request are quite sufficient in practice to cover all the encountered requests. It is therefore sufficient to use just a single byte as description of the various temperature-control requests.

Preferably, the types include the three temperature-control requests slight heating, intermediate heating and strong heating.

The three types of temperature-control requests preferably also include slight cooling, intermediate cooling and strong cooling.

In a particularly preferred embodiment, one of the types describes the presence of a fault.

In particular, the component is fluid-cooled, and can be flushed with the fluid for homogenizing the temperature distribution, wherein the types include a temperature-control request describing flushing.

The signal is a byte, and preferably, the eight types of the temperature-control request can be described by exactly this one byte.

The device is preferably a device for a bus architecture, in particular for a CAN bus, and the signal is a message on the bus.

Preferably, the temperature-control request is a temperature-control request for a component, wherein the component is a battery, in particular a traction battery.

In particular, the device is a device of a motor vehicle, preferably a control device, in particular for the battery management system or the charge management.

In a method for transmitting a temperature-control request, various types of the temperature-control request are described in a single byte.

BRIEF DESCRIPTION OF THE DRAWING

Further features and advantages of the invention will be evident from the description of an exemplary embodiment with reference to the drawing.

FIG. 1 shows a control device for battery management connected to a control device for charge management.

DETAILED DESCRIPTION OF PREFERRED EMBODIMENTS

The FIGURE shows a first device 1 for processing a signal in the form of a control device for battery management system and a second device 2 for processing a signal in the form of a control device for charge management, which is disposed, in particular, in a gateway between different (CAN) buses.

A temperature-control request in the form of request for temperature-control of a battery 4 should be transferred in the simplest manner from the first device 1 for processing a signal in the form of a control device for a battery management system to the second device 2 for processing a signal in the form of a control device for load management. For this purpose, a signal uses a single byte for a connection 3, for example a connection via a bus 3, wherein the single byte has eight bits describing eight different states describing the following eight requests: error, slight heating, intermediate heating, strong heating, rinsing (flushing coolant without heating or cooling in order to attain a homogeneous temperature distribution in the battery), strong cooling, intermediate cooling, slight cooling.

The invention claimed is:

1. A method of transmitting a signal describing a temperature-control request for a battery, wherein the signal is a single byte configured to describe eight types of the temperature-control request, the single byte comprising at least the following temperature-control requests:
   slight heating, intermediate heating and strong heating;
   slight cooling, intermediate cooling and strong cooling;
   presence of a fault; and
   flushing the battery with a fluid for homogenizing a temperature distribution of the battery.

2. The method of claim 1, wherein the battery is a traction battery.

3. The method of claim 1, wherein the signal is transmitted as a message on a bus architecture.

4. The method of claim 1, wherein the signal is transmitted as a message on a CAN bus.

5. A control device of a motor vehicle programmed to generate and/or evaluate a signal, wherein the signal is a single byte configured to describe eight types of a temperature-control request for a battery of the motor vehicle, wherein the types of the temperature-control request comprise:
- slight heating, intermediate heating and strong heating;
- slight cooling, intermediate cooling and strong cooling;
- presence of a fault; and
- flushing the battery with a fluid for homogenizing a temperature distribution of the battery.

6. The control device of claim 5, wherein the battery is a traction battery.

7. The control device of claim 5, comprising a first control device for battery management and a second control device for load management.

* * * * *